United States Patent [19]

Suzuki

[11] Patent Number: 5,408,770
[45] Date of Patent: Apr. 25, 1995

[54] SHEET STRETCHER INCLUDING SHEET ATTACHMENT HOLES AND SHEET CONNECTION MEANS

[75] Inventor: Teruo Suzuki, Chiba, Japan

[73] Assignee: SCS Promotion Company Limited, Chiba, Japan

[21] Appl. No.: 910,182

[22] PCT Filed: Dec. 27, 1991

[86] PCT No.: PCT/JP91/01781
§ 371 Date: Jul. 17, 1992
§ 102(e) Date: Jul. 17, 1992

[87] PCT Pub. No.: WO92/12309
PCT Pub. Date: Jul. 23, 1992

[30] Foreign Application Priority Data

Jan. 10, 1991 [JP] Japan .................. 3-12418
May 15, 1991 [JP] Japan .................. 3-140819
Jun. 8, 1991 [JP] Japan .................. 3-163997
Aug. 29, 1991 [JP] Japan .................. 3-244407

[51] Int. Cl.[6] .............. D06C 3/08; E04G 1/26; E06B 9/00; G09F 17/00
[52] U.S. Cl. .................. 38/102; 182/129; 160/368.1; 160/399; 40/603; 38/102.91
[58] Field of Search .......... 38/102, 102.1, 102.91; 40/603, 610, 574, 368.1; 160/308.1, 378, 399, 402; 248/472, 321.4, 231.1, 488; 24/16 R, 73 A; 182/129

[56] References Cited

U.S. PATENT DOCUMENTS

| 2,338,297 | 1/1944 | Mugdan et al. | |
|---|---|---|---|
| 2,391,871 | 1/1946 | Benson | 160/368 |
| 2,527,258 | 10/1950 | Kahn | 2/93 |
| 2,647,261 | 8/1953 | Rassner | 40/610 |
| 3,088,559 | 5/1963 | Farnsworth et al. | 160/399 |
| 3,276,512 | 10/1966 | Gallagher | 160/368 |
| 3,461,584 | 8/1969 | Wilson . | |
| 3,701,210 | 10/1972 | Smith | 40/129 |
| 3,995,715 | 12/1976 | Virtanen | 182/129 |
| 4,107,826 | 8/1978 | Tysdal | 160/399 X |
| 4,369,591 | 1/1983 | Vicino | 40/610 |
| 4,399,640 | 8/1983 | Porter | 160/368.1 X |
| 4,776,121 | 10/1988 | Vicino | 40/610 |
| 4,800,947 | 1/1989 | Loomis | 160/368.1 |
| 4,817,655 | 4/1989 | Brooks | 160/378 X |
| 4,875,302 | 10/1989 | Noffsinger | 40/610 |
| 4,894,888 | 1/1990 | Bassouls | 24/400 |
| 4,937,961 | 7/1990 | Gandy et al. | 40/603 |
| 5,009,050 | 4/1991 | Gruber | 160/402 |
| 5,042,182 | 8/1991 | King | 40/603 |
| 5,046,545 | 9/1991 | Loomis et al. | 160/368.1 |
| 5,058,299 | 10/1991 | Suzuki | 40/603 |
| 5,226,544 | 7/1993 | Gallucc et al. | 206/386 |

FOREIGN PATENT DOCUMENTS

| 256293 | 2/1964 | Australia . |
|---|---|---|
| 36221/68 | 3/1970 | Australia . |
| 88485/82 | 3/1983 | Australia . |
| 12339/88 | 9/1988 | Australia . |
| 11165/88 | 4/1990 | Australia . |
| 1041268 | 10/1978 | Canada . |
| 1219111 | 3/1987 | Canada . |
| 1294752 | 1/1992 | Canada . |
| 0078391 | 9/1982 | European Pat. Off. . |
| 0132495 | 2/1985 | European Pat. Off. . |

(List continued on next page.)

OTHER PUBLICATIONS

International Search Report.

Primary Examiner—Clifford D. Crowder
Assistant Examiner—Ismael Izaguirre
Attorney, Agent, or Firm—Nixon & Vanderhye

[57] ABSTRACT

A sheet stretcher (7) comprises a base (7a), which has a hole (17) for slidably receiving an expanded portion (5) formed at an edge of a sheet (2), a slit (18) communicating with the hole (17) and through which the end portion (11) of the sheet (2) continuous to its expanded portion (5) is insertable, a hole (19) for slidably receiving a further expanded portion (5) formed at an edge of a further sheet (2), a slit (20) communicating with the hole (19) through which the end portion (11) of the further sheet (2) continuous to the further expanded portion (5) is insertable.

8 Claims, 15 Drawing Sheets

FOREIGN PATENT DOCUMENTS

| | | |
|---|---|---|
| 0136400 | 4/1985 | European Pat. Off. . |
| 0389104 | 9/1990 | European Pat. Off. . |
| 2255448 | 7/1975 | France . |
| 2572832 | 11/1984 | France . |
| 0294301 | 12/1988 | France . |
| 1244059 | 7/1967 | Germany ............................ 108/51 R |
| 2217826 | 10/1973 | Germany . |
| 2336733 | 2/1975 | Germany . |
| 2407552 | 8/1975 | Germany . |
| 2817210 | 11/1978 | Germany . |
| 3142829A1 | 10/1981 | Germany . |
| 3412064A1 | 3/1984 | Germany . |
| 51-42783 | 10/1976 | Japan . |
| 55-29454 | 2/1980 | Japan . |
| 57-66936 | 4/1982 | Japan . |
| 61-9951 | 3/1986 | Japan . |
| 61-21367 | 7/1986 | Japan . |
| 64-38672 | 3/1989 | Japan . |
| 1-136975 | 9/1989 | Japan . |
| 1299109 | 9/1989 | Japan . |
| 2-87283 | 7/1990 | Japan . |
| 1482687 | 8/1977 | United Kingdom . |
| 2226591 | 7/1990 | United Kingdom . |

SHEET STRETCHER INCLUDING SHEET ATTACHMENT HOLES AND SHEET CONNECTION MEANS

FIELD OF THE ART

This invention relates to sheet stretchers for stretching a sheet or a construction used on the site of constructing, taking down, or repairing a building or the like or at the painting site, or a sheet for the prevention of paint scattering, or a sheet for advertisement displays used in outdoor advertisements, and also relates to sheets to be stretched by such sheet stretchers and attachment adjusters for attaching such sheet stretchers to a frame of the scaffolding.

Besides, this invention relates to sheet assemblies which are used on a construction site, or on a painting site, of constructing, taking down, or repairing a building, or at an outdoor advertisement as well as sheet removal preventers used in the sheet assemblies.

BACKGROUND ART

For example, on a construction site, a scaffolding is set up around a building and a sheet is stretched around the scaffolding. Conventionally, in such sheet stretching, unit sheets or a sheet and a scaffolding are connected by rope or wire being passed sequentially through eyelets provided in the respective sheets.

The workability of stretching sheets with the rope passed through the eyelets as described above is extremely low, and much time is spent. The connection by the rope is not so satisfactory because unit sheets with eyelets must be prepared and unit sheets themselves cannot help being expensive. These problems arise similarly in sheets which are put up at a painting site or sheets for advertisement display used at tile outdoor advertisement and the like.

In view of the above, it is an object of the present invention to provide an sheet stretcher which is capable of stretching a sheet very easily, a sheet to be stretched by the stretcher as well as an attachment adjuster which is capable of adjusting the position of connection of the sheet stretcher to a scaffolding or the like.

DISCLOSURE OF THE INVENTION

According to the present invention, the above object is achieved by a sheet stretcher having a first hole for slidably receiving an expanded portion formed at an edge of a sheet and a first slit continuous to tile first hole and through which the edge of the sheet continuous to the expanded portion is insertable.

Furthermore, according to the present invention, the above object is achieved by a sheet stretcher having a second hole formed opposite to the first slit for slidably receiving an expanded portion of an attachment adjuster having an attachment plate continuous to the expanded portion or a further expanded portion formed at an edge of a further sheet; and a second slit formed continuous to the second hole and formed opposite to the first slit and through which the attachment plate of the attachment adjuster or the edge of the further sheet formed continuous to the further expanded portion is insertable.

According to the present invention, the above object is achieved by an attachment adjuster for attaching to a frame a sheet stretcher having a first hole for slidably receiving an expanded portion formed at an edge of a sheet; a first slit continuous to the first hole and through which the edge of the sheet formed continuous to the expanded portion is insertable; a second hole formed opposite to the first hole; a second slit continuous to the second hole and-formed opposite to the first slit, the adjuster comprising an expanded portion to be received slidably in the second hole and an attachment plate continuous to the expanded portion and extendible through the second slit.

According to the present invention, the above object is also achieved by a sheet stretcher comprising a base and connecting means formed at the base to connect the base with a frame for stretching a sheet, the base having a first hole for slidably receiving an expanded portion formed at the edge of the sheet; a first slit communicating with the first hole and through which the edge of the sheet formed continuous to the expanded portion is insertable; a second hole for slidably receiving a further expanded portion formed at an edge of a further sheet; and a second slit communicating with the second hole and through which the edge of the further sheet continuous to the further expanded portion is insertable.

According to the present invention, the above object is achieved by an attachment adjuster for attaching a sheet stretcher to a frame, the stretcher comprising a base and connecting means formed at the base to connect the base with a frame for stretching a sheet, the base including a first hole for slidably receiving an expanded portion formed at an edge of the sheet; a first slit communicating with the first hole and through which the edge of the sheet formed continuous to the expanded portion is insertable; a second hole for slidably receiving a further expanded portion formed at an edge of a further sheet; a second slit communicating with the second hole and through which the edge of the further sheet continuous to the further expanded portion is insertable; a third hole; and a third slit communicating with the third hole; the attachment adjuster having an expanded portion to be slidably received in the third hole and a plate portion integral with the expanded portion so as to be extendible through the third slit.

The sheet stretcher may have therein a slot disposed between the first and second holes and through which a string-like member which connects the sheet stretcher to a frame is insertable.

It is also an object of the present invention to provide a sheet removal preventer which permits the above sheet stretcher to be used even In a sheet having no expanded portions, and a sheet assembly using such sheet removal preventer.

According to the present invention, the above object is achieved by a sheet assembly comprising a sheet; a sheet stretcher having a first hole receiving an edge of the sheet and a first slit continuous to the first hole and through which the end portion of the sheet continuous to the edge of the sheet is inserted; and a sheet removal preventer disposed in the first hole so as to surround the edge of the sheet in order to prevent the edge of the sheet from being removed from the first hole through the first slit.

According to the present invention, the above object is achieved by a sheet assembly, wherein the sheet stretcher has a second hole formed opposite to the first silt and receiving an edge of a further sheet; a second slit continuous to the second hole and formed opposite to the first slit and through which an end portion of the Further sheet continuous to the edge of the further sheet is inserted; and further comprising a sheet removal preventer disposed in the second hole so as to surround the edge of the further sheet in order to prevent the edge of the further sheet from being remove from the second hole through the second slit.

According to the present invention, the above object is achieved by a sheet assembly wherein the sheet stretcher further has a second hole formed opposite to the first slit and receiving an expanded portion of an attachment adjuster including an attachment plate continuous to the expanded portion; and a second slit formed continuous to the second hole and opposite to the first slit and through which the attachment plate of the attachment adjuster is inserted.

According to the present invention, the above object is also achieved by a sheet removal preventer for a sheet assembly including a sheet and a sheet stretcher having a first hole receiving an edge of the sheet and a first slit continuous to the first hole and through which an end portion of the sheet continuous to the edge of the sheet is insertable, the sheet removal preventer being disposed in the first hole so as to surround the edge of the sheet in order to prevent the edge of the sheet from being removed from the first hole through the first slit.

In addition, according to the present invention, the above object is achieved by a sheet stretched by a sheet stretcher of the present invention and having expanded portions at at least opposite edges of the sheet.

The sheet stretcher according to the present invention may be made of any one of wood, metal and a synthetic resin. It is preferably made of hard plastics or aluminum in view of mechanical strength and lightness, and more preferably made of aluminum. The sheet stretcher in the present invention may have a cavity therein as far as hardness permits in order to lightening it. While the length of the sheet stretcher in the present invention may correspond to the length of a long side or a shorter side of the edge of the sheet to which the equipment is applied, it may instead be sufficiently shorter than the respective lengths of the long and shorter sides of the applied sheet. A plurality of such shorter stretchers may be provided to each of adjacent edges of sheets to stretch the sheets. Especially, when the length of the edge of the sheet is more than several meters, the use of a required number of sheets whose length is one meter at most to connect adjacent edges of both the sheets facilitates sheet stretching.

The sheet in the present invention may be a general one obtained by extrusion of a material such as a nylon sheet or a vinyl sheet, or it may be a cloth sheet or a nonwoven fabric sheet made of natural fibers, chemical fibers or a combination of these fibers. Besides, the sheet in the present invention is not required to be completely non-cellular, and it may be a mesh-like sheet which is called a net.

The expanded portion of the sheet in the present invention may an expansion integral with an edge of a sheet itself. Alternatively, it may be a one formed by rolling up an edge of a sheet itself. Alternatively, it may be a one formed by inserting a rope into a loop made at an edge of a sheet by folding and seaming. The expanded portion of the sheet in the present invention is not required to be formed on the overall edge of the sheet. It is only required to be formed at least at adjacent edges of sheets in connection with the sheet stretcher used. Alternatively, the sheets are not required to have corresponding continuous expanded portions through the whole length of the adjacent edges of the sheets, but they may have at least discrete expanded portions along the adjacent edges of the sheets. The sectional shape of the expanded portions may be, circular, triangular, rectangular or more polygonal.

The first and the second holes in the present invention may be a through hole which opens to the outside at each end. Alternatively, they may be a hole of which at least one end is open to the outside to receive the corresponding expanded portion, and therefore, it may be a hole closed at the other end. The sectional shape of the first and the second holes may be circular, triangular, rectangular or more polygonal in connection with the shape of the expanded portion of the sheet or in the connection with the shape of the sheet removal preventer surrounding the edge of the sheet or in connection with the shape of the expanded portion of the attachment adjuster.

The widths of the first and the second silts arc required to be such that the expanded portion of the sheet is not removed through the slit. If the silt is too narrow, the freedom of the sheet will be lost, sheet stretching will be difficult, or the edges of the sheet may be damaged. In order to prevent damage to the edges of the sheet, that portion of the sheet stretcher which defines the silts is required to be smooth.

The attachment adjuster in the present invention is preferably made of the same material as the sheet stretcher. If the adjuster receives a maximum load, it may be made of a material of which the mechanical strength is high. The expanded portion of the present adjuster is not required to be formed through its overall length. Expanded portions may be disposed discretely if the mechanical strength permits.

According to the present invention, one of the connecting means comprises a plate portion integral with the base. In a preferred embodiment, the plate portion has a slit into which a string-like member is insertable.

According to the present invention, one of the connecting means has a third hole formed in the base; a third slit formed in the base so as to communicate with the third hole; and an attachment adjuster having an expanded portion to be slidably received in the third hole and a plate portion integral with the expanded portion and insertable through the third slit. The present plate portion may have a silt through which a string-like member is insertable. Alternatively, it may have a gripper which is capable of gripping a frame.

The sheet assembly which is assembled by using the sheet stretcher in the present invention is not limited to applied to the building construction, but, for example, it may be applied on the painting site or to the advertisement display.

The number of slots disposed between the first and the second holes in the present invention may be one if the sheet stretcher can be connected to the frame. In order to securely connect a long sheet stretcher to the frame without being tilt and lowering its mechanical strength, a plurality of slots are preferably disposed discretely in the stretcher along its long side. As the string-like member inserted into the present slots, rope, wire, or a belt with a buckle may be exemplified, but the other string-like members may be usable, of course.

The inventive sheet removal preventer is preferably made of a flexible material such as a synthetic resin. The one made of hard or soft vinyl chloride is illustrated as a preferred example. When an easily bendable metal plate which can hold its shape after bending is used as a core in the sheet removal preventer, the preventer can be attached together with the edge of the sheet in the hole in the sheet stretcher with the edge of the sheet being securely held in the preventer. As a result, the workability is improved greatly.

In the present invention, the expanded portion of the sheet is inserted and received in the first hole in the sheet stretcher, the expanded portion of a further sheet is inserted and received in the second hole in the sheet stretcher. This work is made further for still further sheet stretchers and other sheets prepared to thereby obtain an sheet assembly.

When each sheet stretcher is connected to a frame for stretching a sheet through connecting means, the sheet assembly is held firmly to the frame, and as a result, the center of the sheet assembly is prevented from being swelled in wind and so on.

For example, when the sheet assembly is successively heightened in accordance with the increasing height of a high-rise building under construction by stretching sheets sequentially upwards in accordance with the progress of construction of the building, the string-like member inserted into the slots is connected to the frame and the uppermost sheet stretcher during the construction is attached temporarily to the frame. After this temporary attachment, when another sheet is put up above the sheet stretched so far, the temporary attachment is released and a new sheet is applied to the sheet stretcher.

In the sheet assembly with the sheet removal preventer, the edge of the sheet is prevented from being removed from the first hole through time first slit. Therefore, even when no expanded portion is formed at the sheet, the edge of the sheet is firmly held by the sheet stretcher to thereby maintain the stretched condition of the sheet.

The present invention will be described hereinafter in more detail with respect to embodiments thereof shown in the drawings. By this description, the object and features of the present and other inventions will be clarified.

It is to be noted that the present invention is not at all limited to these embodiments.

BEST MODE FOR CARRYING OUT THE INVENTION

Figure 1:
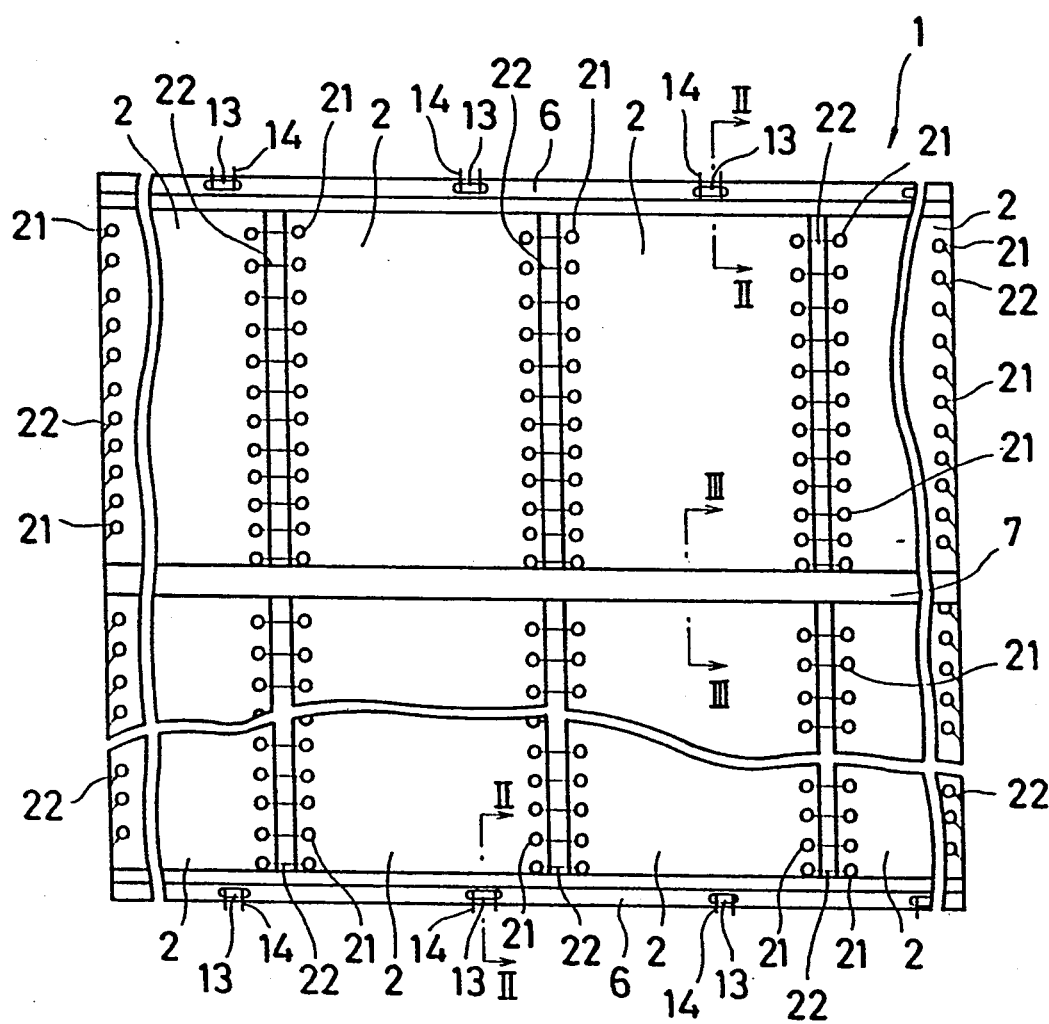
FIG. 1 is a front view of an sheet assembly which is assembled by using a sheet stretcher of a preferred embodiment of the present invention.
Figure 2:
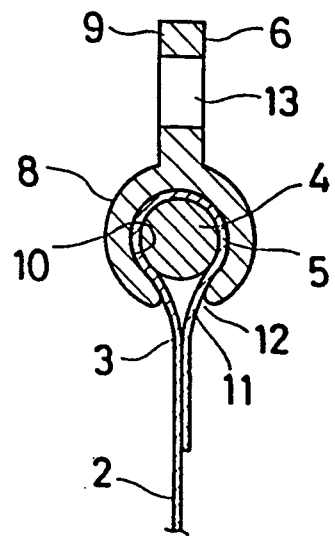
FIG. 2 is a sectional view taken along the line II—II shown in FIG. 1.
Figure 3:
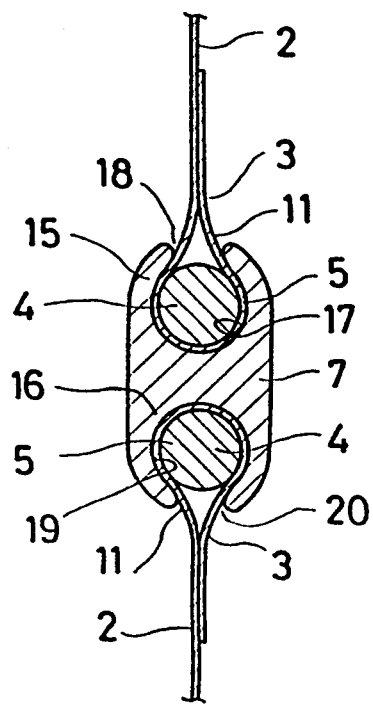
FIG. 3 is a sectional view taken along the line III—III shown in FIGS. 1 and 4.

Referring to FIGS. 1–3, a sheet assembly 1 which is put up so as to surround a scaffolding as the frame at the construction site comprises many unit sheets 2. In the respective sheets 2 of the present embodiment, their upper and lower edges are folded and seamed respectively at a position 3, and a rope 4 is inserted into the thus formed respective edge loops to form expanded portions 5. In time sheet assembly 1, first sheet stretchers 6 extending horizontally are applied between an upper edge of the uppermost sheet 2 and a horizontal member of a scaffolding (not shown) concerned as well as between a lower edge of the lowermost sheet 2 and a horizontal member of the scaffolding concerned. A second sheet stretcher 7 extending horizontally is applied between a lower edge of an upper sheet 2 and an upper edge of a lower sheet 2.

The sheet stretcher 6 comprises a semicylindrical portion 8 and an attachment plate 9 formed integral with the semicylindrical portion 8, The semicylindrical portion 8 has through its overall length a first through hole 10 which slidably receives the expanded portion 5 formed at the edge of the sheet 2 as well as a first slit 12 communicating with the through hole 10 and through which an edge portion 11 formed continuous to the expanded portion 5 of the sheet 2 is insertable. An attachment plate 9 formed integral with the opposite side of the semicylindrical portion 8 from the slit 12 has slots 13 at a plurality of positions. Wire or rope 14 wound around the horizontal member of the scaffolding is inserted into the slots 13, so that the sheet stretcher 6 is attached to the horizontal member of the scaffolding.

Figure 4:
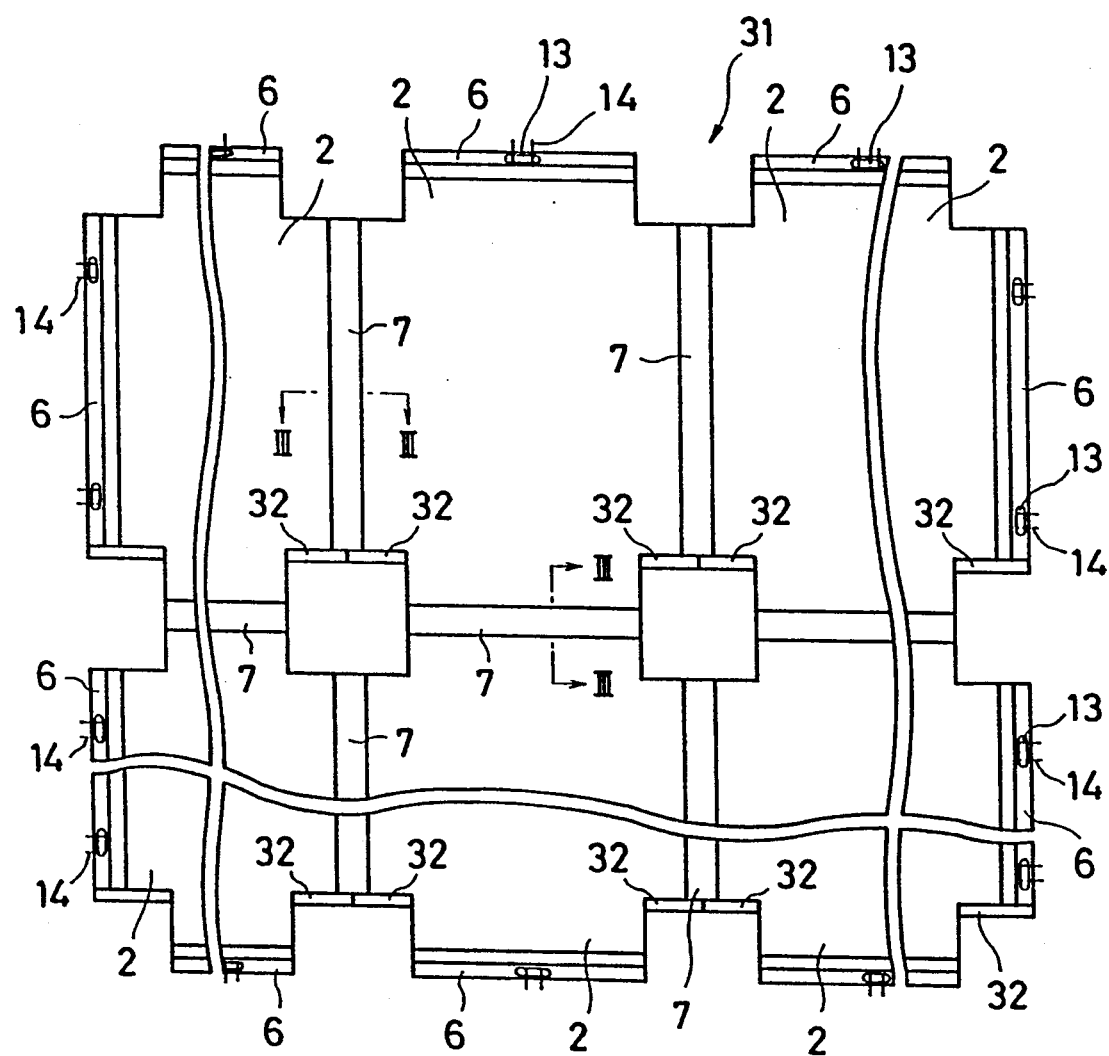
FIG. 4 is a front view of a sheet assembly which is assembled by using a sheet stretcher of another preferred embodiment of the present invention.

The sheet stretcher 7 comprises two semicylindrical portions 15 and 16 formed integral with each other. The semicylindrical portion 15 has through its overall length a first through hole 17 which slidably receives the expanded portion 5 formed at the lower edge of the upper sheet 2 as well as a first slit 18 formed continuous to the through hole 17 and through which the edge portion 11 formed continuous to the expanded portion 5 of the upper sheet 2 is insertable. The semicylindrical portion 16 has through its overall length a second through to the respective associated vertical members of the scaffolding in the sheet assembly 1, rectangular sheets 2 which have cutouts at their four corners as well as expanded portions at their right and left edges as shown in FIG. 4 may be prepared, every adjacent right and left sheets are connected by sheet stretchers 7, and the leftmost and rightmost sheets 2 are connected to the respective associated vertical members of the scaffolding by the sheet stretcher 6 and rope 14 to compose a sheet assembly 31. Such construction needs neither eyelets of the sheets 2 nor work for connecting the sheets 2 to each other by rope or wire. In this case, either an additional expanded portion 32 is required to be formed on the sheet 2 or the above-mentioned sheet stretcher 7 with through holes 17 and 19 shut at one end is required to be used, in order to prevent the sheet stretcher 7 that connects adjacent right and left sheets from falling.

In the sheet assembly 31 of the present embodiment, the separate sheet stretchers 6 and 7 are used in each sheet 2. Such use of the separate respective sheet stretchers 6 and 7 can improve workability.

While the sheets 2 are attached to the horizontal and vertical members of the scaffolding through the sheet stretchers 6 with the slots 13 in the sheet assemblies 1 and 31, two attachment adjusters 44 each comprising an expanded portion 41 and an attachment plate 43 continuous to the expanded portion 41 and having a slot 42 may be prepared, and the respective expanded portions 41 or the attachment adjusters 44 may be inserted into the through holes 17 in the sheet stretchers 7 from one end of the sheet stretchers 7 to make the adapter plates 43 extend hole 19 formed on the opposite side of the stretcher 7 from the slit 18 to slidably receive the expanded portion 5 formed at an upper edge of the lower sheet 2 as well as a second slit 20 formed continuous to the through hole 19 and opposite to the slit 18, and through which the edge 11 continuous to the expanded portion 5 of the lower sheet 2 is insertable. The sheet stretcher 7 connects the upper and lower sheets 2 at their edges such that the through holes 17 and 19 receive the expanded portions 5 of the upper and lower sheets 2, respectively.

In the sheet assembly 1 of the present embodiment, a sheet 2 with eyelets 21 in its right and left edges is used, the adjacent right and left sheets 2 are connected to each other at their edges with wire or rope 22 inserted into the adjacent eyelets 21. The left and right edges of the leftmost and rightmost sheets 2 are connected to vertical members of the scaffolding through the rope 22.

The sheet assembly 1 thus composed is framed around the scaffolding in the construction site as described above, thereby preventing the building materials from falling downwards on a road during construction due to carelessness.

In the sheet stretchers 6 and 7 applied to the present sheet assembly 1, many sheets 2 can be put up very easily in a short time to assemble the sheet assembly 1 just by inserting the expanded portions 5 of the sheets 2 into the through holes 10, 17, and 19 successively through from the ends of the stretchers.

Figure 5:
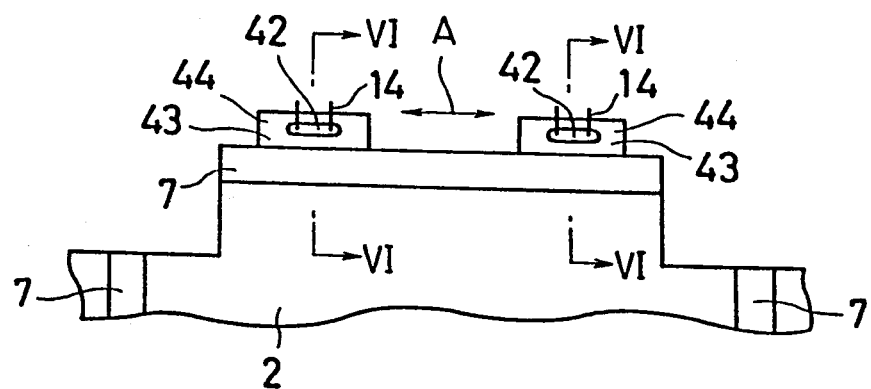
FIG. 5 is a front view of the essential part of a sheet assembly which is assembled by using an attachment adjuster of a preferred embodiment of the present invention.
Figure 6:
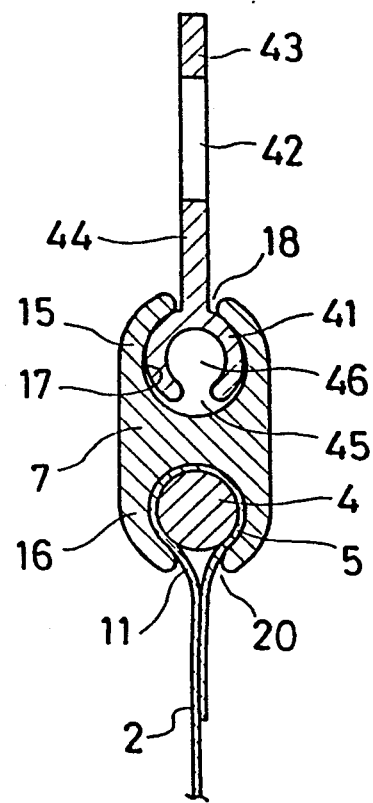
FIG. 6 is a sectional view taken along the line VI—VI shown in FIG. 5.

While adjacent right and left sheets 2 with eyelets 21 in their right and left edges are connected by the rope 22 to each other and the leftmost and rightmost sheets 2 are connected through the slits 18 so as to make the expanded portions 41 of the attachment adjusters 44 slidably received in the through holes 17. The uppermost, lowermost, rightmost and leftmost sheets 2 may be attached to the scaffolding by inserting rope 14 into the slot 42 and winding the rope 14 around the horizontal or the vertical member of the scaffolding. The use of such attachment adjuster 44 is preferable as the case may be because the position of attachment of the sheets to the scaffolding through the rope 14 can be adjusted since the adjuster is slidable relative to the sheet stretcher 7, that is, in the direction A, as shown in FIGS. 5 and 6. Besides, a slit 45 and a cavity 46 communicating with the slit 45 may be formed in the expanded portion 41 of the attachment adjuster 44 in order to lighten the adjuster. While two attachment adjusters 44 are used for the connection of the sheet to the scaffolding in the present embodiment, one or more than three adjusters may instead be used for connection to the scaffolding.

Figure 7:
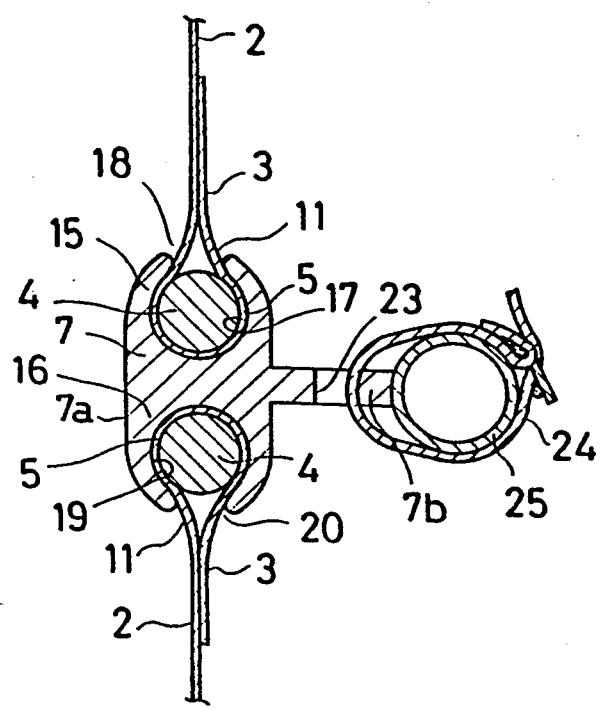
FIG. 7 shows an embodiment of another sheet stretcher according to the present invention.
Figure 8:
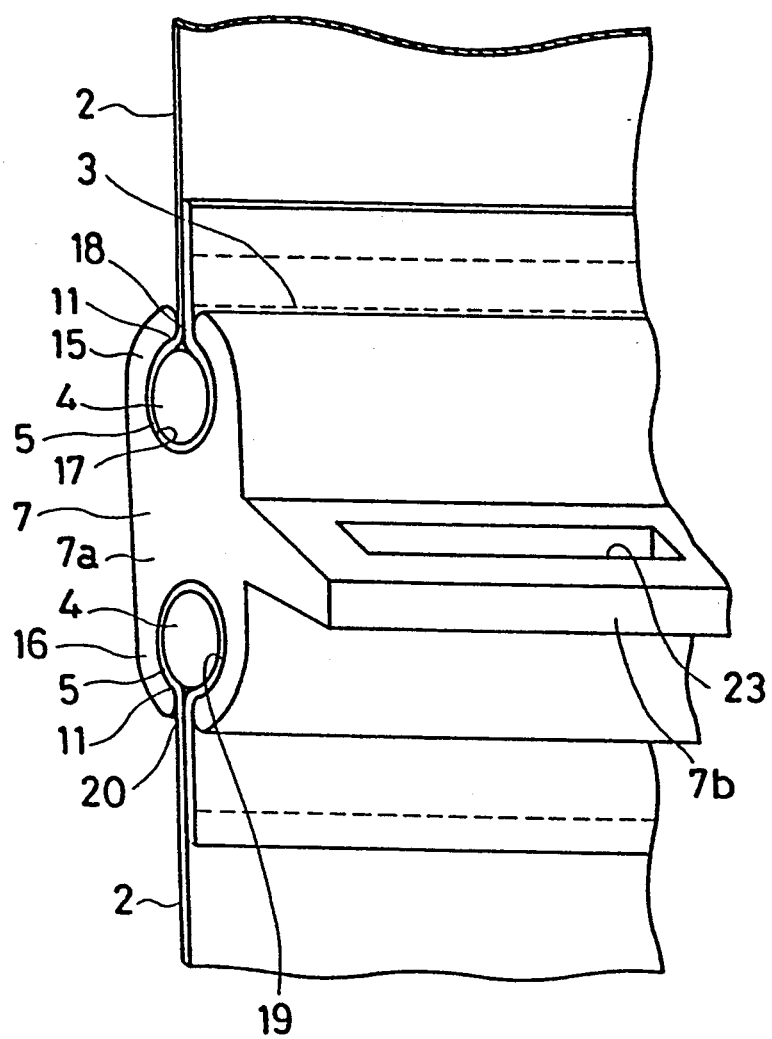
FIG. 8 is a perspective view of the embodiment shown in FIG. 7.

Furthermore, the sheet stretcher 7 may be formed as shown in FIGS. 7 and 8. The sheet stretcher 7 shown in FIGS. 7 and 8 comprises a base 7a including two semicylindrical portions 15 and 16 formed integral with each other and a plate portion 7b formed integral with the base 7a.

A slit 23 is formed in the plate portion 7b of the sheet stretcher. A belt 24 with a buckle as the string-like member is inserted into the slit 23, and the plate portion 7b is connected fixedly to a horizontal member 25 of the scaffolding as the frame member for sheet stretching through the belt 24. In the present embodiment, the connecting means is composed of the plate portion 7b with the slit 23. When the sheet assembly 1 is held to the scaffolding also through the sheet stretcher 7 as described above swelling or blowing of the center of the sheet assembly 1 by the wind and so on is avoided.

Figure 9:
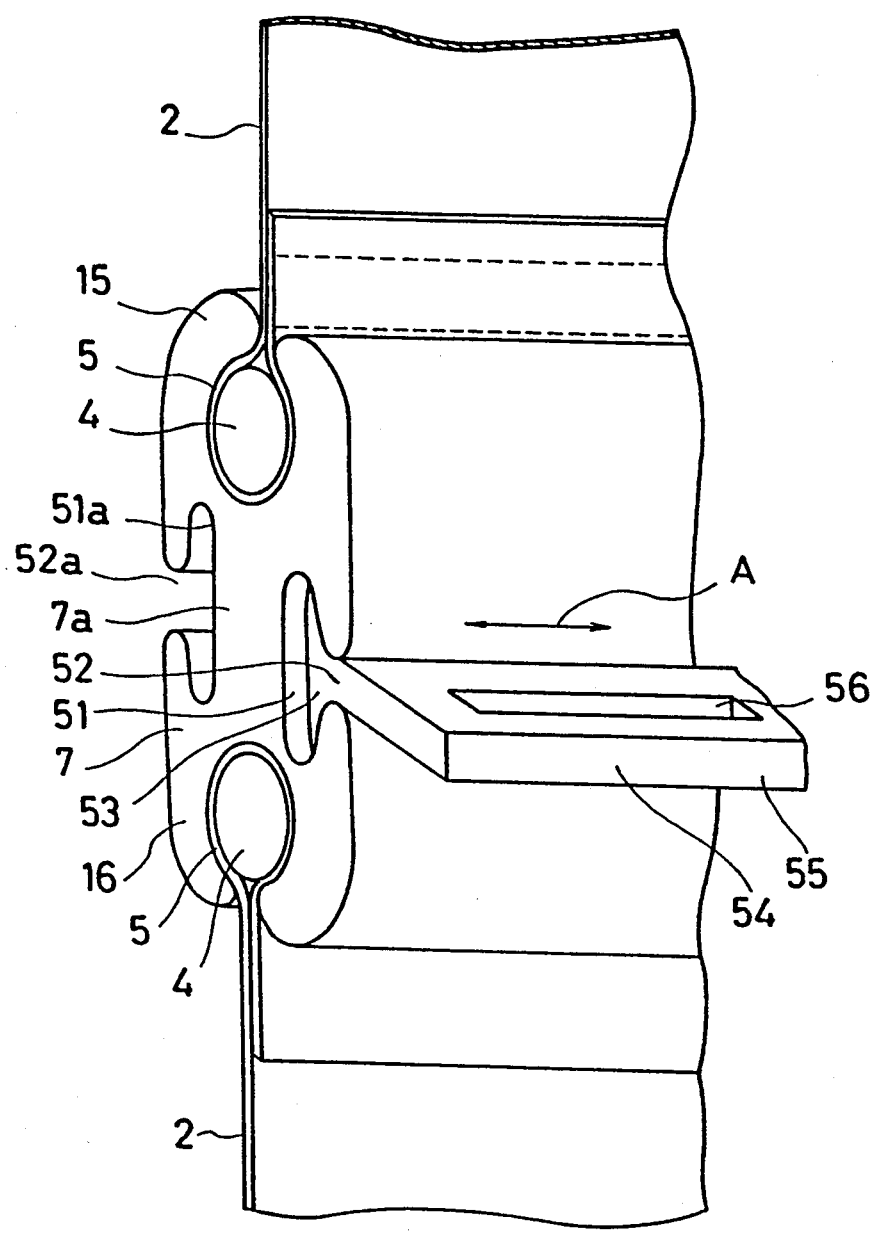
FIG. 9 is a perspective view of a sheet stretcher of another preferred embodiment.

While the connecting means is composed of the plate portion 7b with the slit 23 and formed integral with the base 7a in the above embodiment, connecting means may instead be composed as shown In FIG. 9. Referring to FIG. 9, the connecting means of the present embodiment has a third through hole 51 formed in the base 7a through the overall length thereof; a third slit 52 formed in the base 7a through the overall length thereof and communicating with the through hole 51; an attachment adjuster 55 having an expanded portion 53 received slidably in the through hole 51 and a plate portion 54 formed integral with the expanded portion 53 and insertable into the slit 52. A slit 56 into which the belt 24 (see FIG. 7) is insertable is formed in the plate portion 54. The connecting means shown in FIG. 9 has the same function as the connecting means described above. According to the present connecting means, the position where the attachment adjuster 55 is connected to the horizontal member 25 of the scaffolding can be adjusted freely by sliding the attachment adjuster 55 in the direction A relative to the sheet stretcher 7. If a through hole 51a and a slit 52a corresponding to the through hole 51 and the slit 52 are formed symmetrically in the sheet stretcher 7, the convenience of using the stretcher is improved greatly since sits directivity is not required to be considered in assembling. While the attachment adjuster 55 may be almost as long as the sheet stretcher 7, it may be much shorter than the sheet stretcher 7. One or more such sufficiently short adjusters 55 may be connect to the horizontal member 25 of the scaffolding by applying one or more such adjusters 55 to the sheet stretchers 7.

Figure 10:
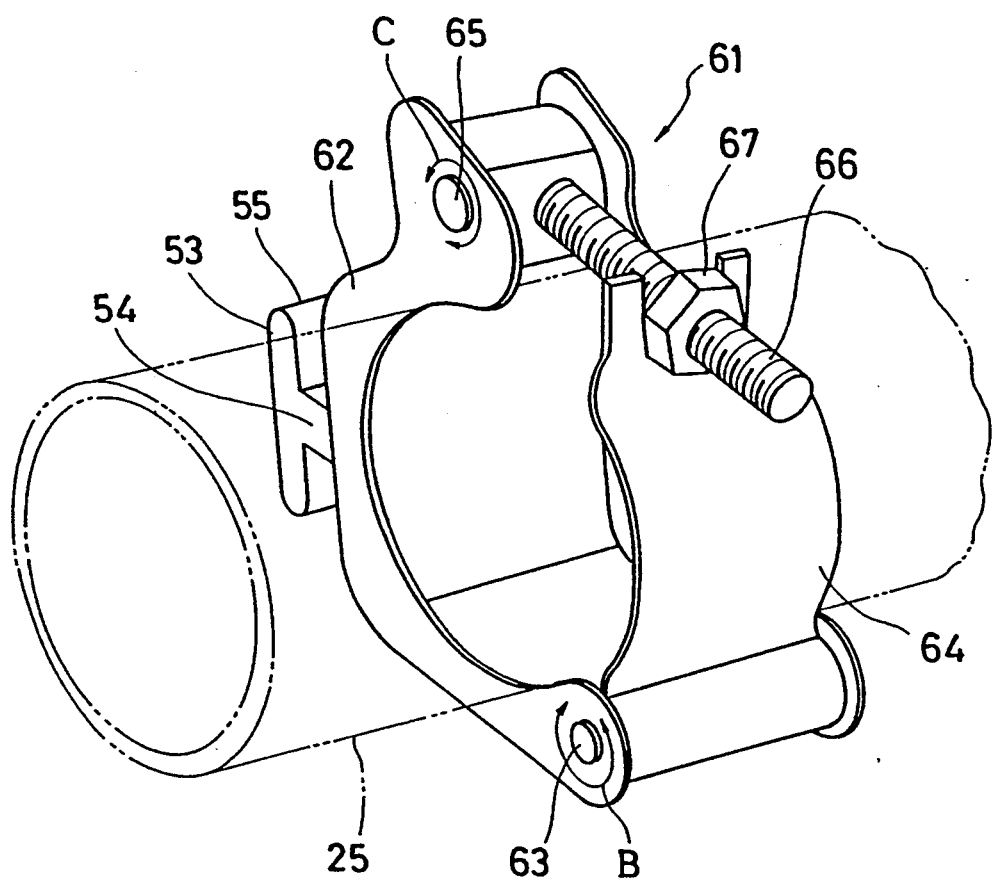
FIG. 10 is a perspective view of a gripper applicable to the sheet stretcher of the present invention.

While the sheet stretcher 7 is illustrated as connected to the horizontal member 25 of the scaffolding through the string-like member such as the belt with a buckle 24 in the embodiment shown in FIG. 9, the sheet stretcher 7 may be connected to the horizontal member 25 of the scaffolding through a gripper 61 capable of gripping the horizontal member 25 of the scaffolding, freely as shown in FIG. 10. The gripper 61 comprises a gripping element 62 to which the plate portion 54 of the attachment adjuster 55 is attached fixedly as by welding; a holding plate 64 connected to the gripping element 62 through a shaft 63 so that it may turn in the directions B; a threaded bar 66 connected to the member 62 through a shaft 65 so that it may turn in the directions C; and a nut 67 screwed over the threaded bar 66. Since the gripper 61 is capable of gripping the horizontal member 25 firmly by tightening the nut 67, the sheet stretcher 7 is connected positively to the scaffolding horizontal member 25 as well as the gripped state of the horizontal member 25 can be released easily by loosening the nut 67 to make the threaded bar 66 and the holding plate 64 tunable freely.

Figure 11:
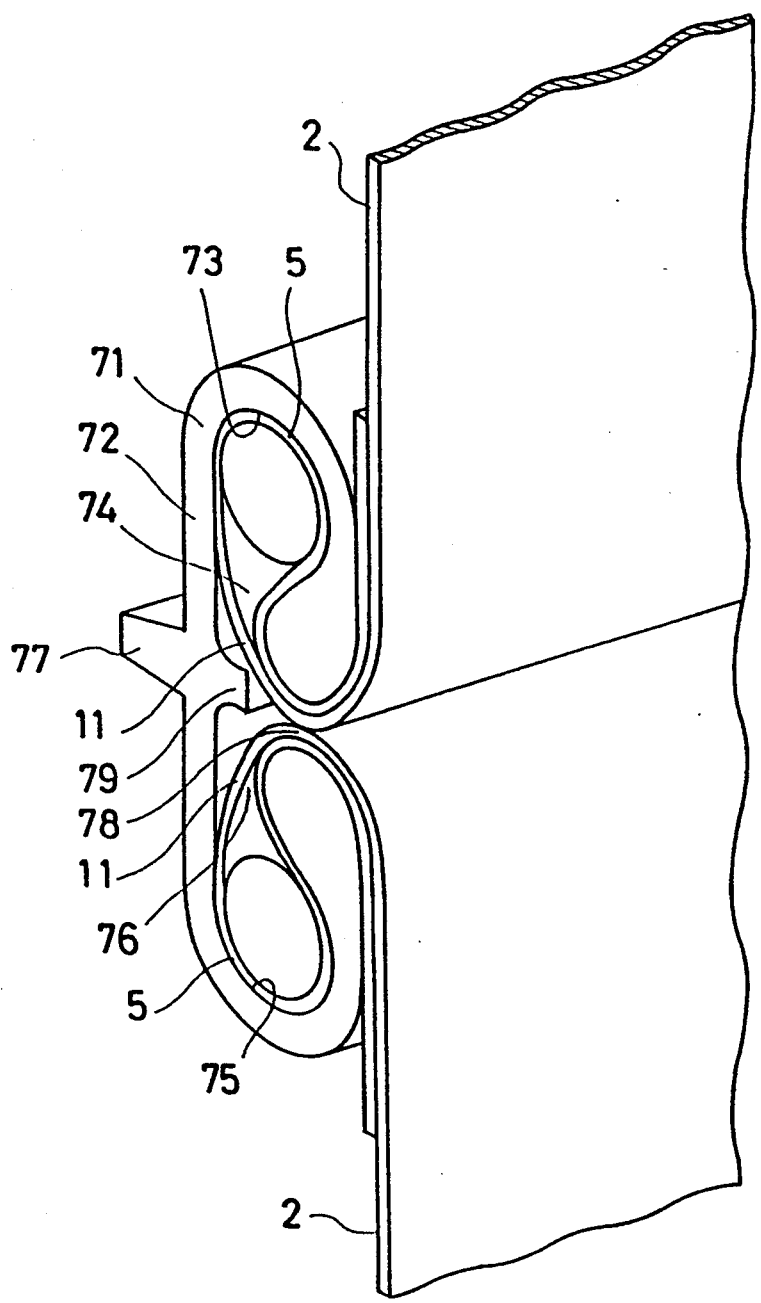
FIG. 11 is a perspective view of a sheet stretcher of another preferred embodiment of the present invention.

In the sheet stretcher 7 described above, the slit 18, through holes 17, 19, and slit 20 are disposed in a line in this order. According to this composition, the base 7a of the sheet stretcher 7 is exposed and the upper and lower sheets 2 are in the state separated by the sheet stretcher 7 as viewed from outside the sheet assembly 1. Thus, there can be an undesirable case from a standpoint of beauty. Especially, for example, when each of parts of an advertisement made of a photograph or the like are required to be printed on the respective surfaces of sheets 2 to display the advertisement by the whole appearance of the sheet assembly 1, the advertisement display is not necessarily satisfactory because the advertisement display is separated by the sheet stretchers 7. A sheet stretcher 71 shown in FIG. 11 comprises a base 72; a first through hole 73 formed in the base 72 to slidably receive an expanded portion 5 formed at the edge portion of the upper sheet 2; a first slit 74 communicating with the first hole 73 and formed in the base 72 so that the edge portion 11 formed continuous to the expanded portion 5 of the upper sheet 2 is inserted therethrough; a second through hole 75 formed in the base 72 to slidably receive the expanded portion 5 formed in the edge portion of the lower sheet 2; a second slit 76 formed in the base 72 so that the edge portion 11 formed continuous to the expanded portion 5 of the lower sheet 2 is inserted therethrough; a plate portion 77 formed at the base 72 as means for connecting the base 72 with the horizontal member 25; and a common slit 78 through which both edge portions 11 of the upper and the lower sheets 2 are inserted. In such sheet stretcher 71, the hole 73, slits 74, 76 and hole 75 are disposed in this order to make the slit 74 and 76 face each other, and the common slit 78 is formed, so that the sheet stretcher 71 itself is covered with the sheets 2 and the upper and lower sheets are stretched as they were continuous to each other. As a result, such composition will be extremely preferable for the advertisement display and the like. Furthermore, in the sheet adjuster 71, a separating protuberance 79 is preferably formed between the slits 74 and 76 such that the respective expanded portions 5 are held positively in the hole 73 and 75. The sheet stretchers 7 and 71 shown in FIGS. 7, 9 and 11 are also applicable to the sheet assembly 31 shown in FIG. 4.

Figure 12:
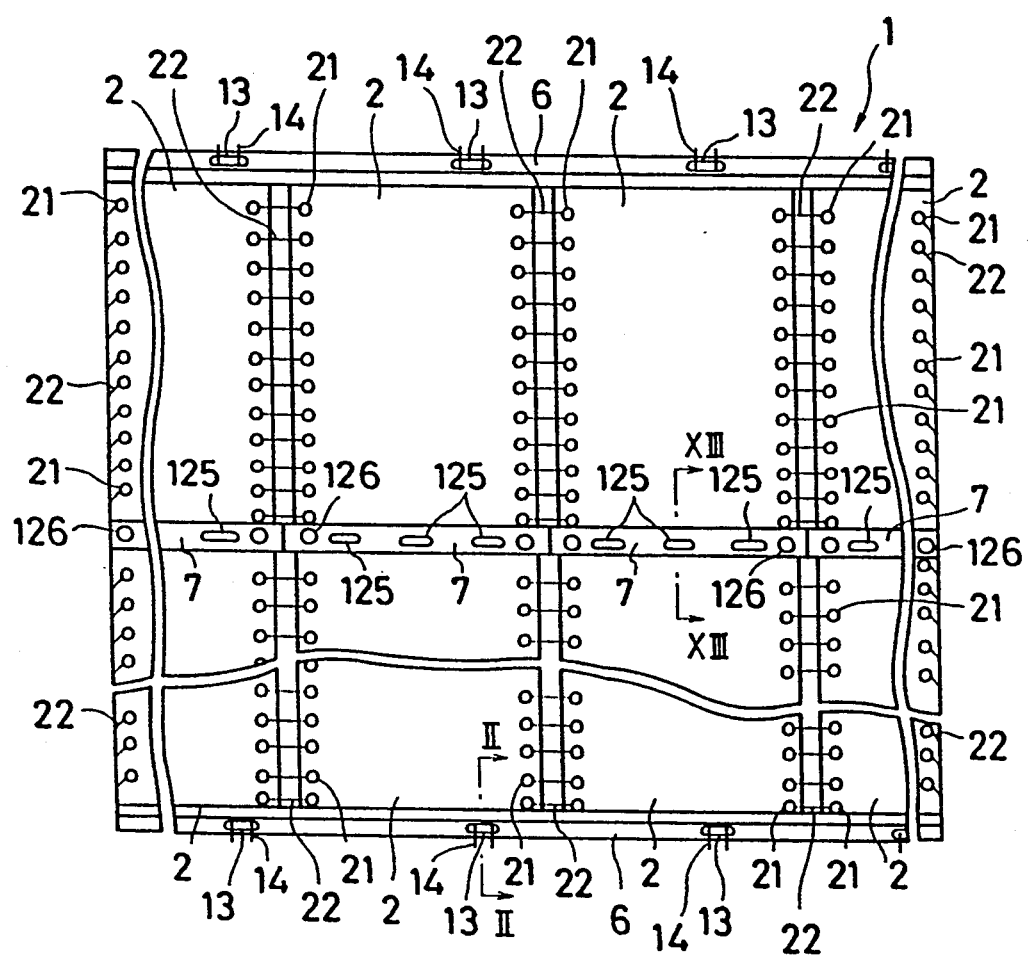
FIG. 12 is a front view of a sheet assembly which is assembled by using a sheet stretcher of another preferred embodiment of the present invention.
Figure 13:
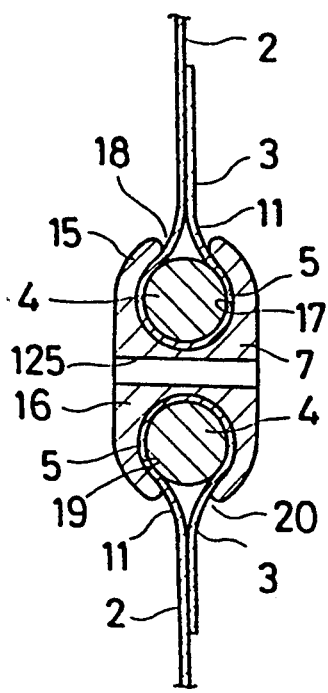
FIG. 13 is a sectional view taken along the line XIII—XIII shown in FIG. 12.
Figure 14:
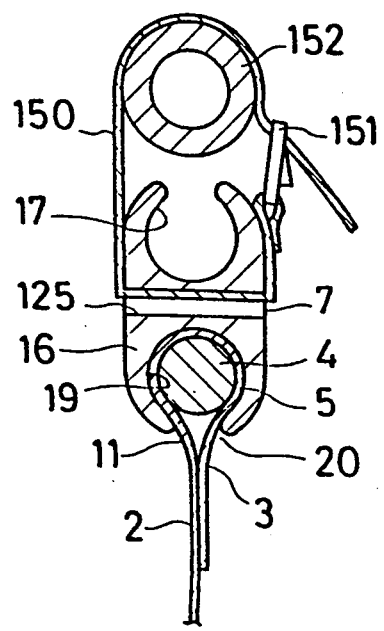
FIG. 14 illustrates in sectional view connection to a frame by the use of time sheet stretcher of the preferred embodiment shown in FIG. 13.

As mentioned above, the uppermost part of each of the sheet assemblies 1 and 31 is connected to the scaffolding horizontal member through the sheet stretcher 6 in the embodiments shown in FIGS. 1 and 4. In such sheet assemblies 1 and 31, when a higher sheet assembly is to be assembled by putting up another sheet 2 above the assembly, the sheet stretcher 6 must be removed and a new sheet stretcher 7 must be used instead. Therefore, a sheet stretcher 7 such as is shown in FIGS. 12 and 13 may be used. In the sheet stretcher 7 shown in FIGS. 12 and 13, a plurality of slots 125 through which the string-like member connecting the sheet stretcher 7 to the frame is insertable are discretely formed between the through holes 17 and 19 in and along the longitudinally extending sheet stretcher 7 as well as a plurality of circular holes 126 are formed in correspondence to the eyelets 21. Such sheet stretcher 7 is used beforehand on top of each of the sheet assemblies 1 and 31 instead of the sheet stretcher 6. As shown in FIG. 14, a lashing belt 150 with a buckle 151 is then wound around a scaffolding horizontal member 152 and inserted into the slot 125 to thereby connect the uppermost sheet stretcher 7 to the scaffolding horizontal member 152. When the sheet assembly is heightened gradually in correspondence to the increasing height of a high-rise building in the middle of construction by using sheet stretchers 7 and sequentially stretching the sheets 2 upward gradually in accordance with the progress of construction of the high-rise building, the lashing belts 150 inserted into the slots 125 are connected to the frame to attach the uppermost sheet stretcher 7 in the middle of construction to the frame temporarily. When the sheet 2 is to be stretched further upward after that temporary attachment, the temporary attachment can be removed and a new sheet 2 is applicable at once. In a similar way, the uppermost sheet stretcher 7 can be connected to the scaffolding horizontal member without using an attachment adjuster 44 such as is shown in FIG. 5. Alternatively, a sheet stretcher 7 with a slot 125 may be used instead of the lowermost sheet stretcher 6 in each of the sheet assemblies 1 and 31. In that case, a lashing belt 150 with a buckle 151 may be inserted into the slot 125 in the sheet stretcher 7 as described above, and the present lowermost sheet stretcher 7 may be connected to the scaffolding horizontal member to assemble the sheet assembly.

Figure 15:
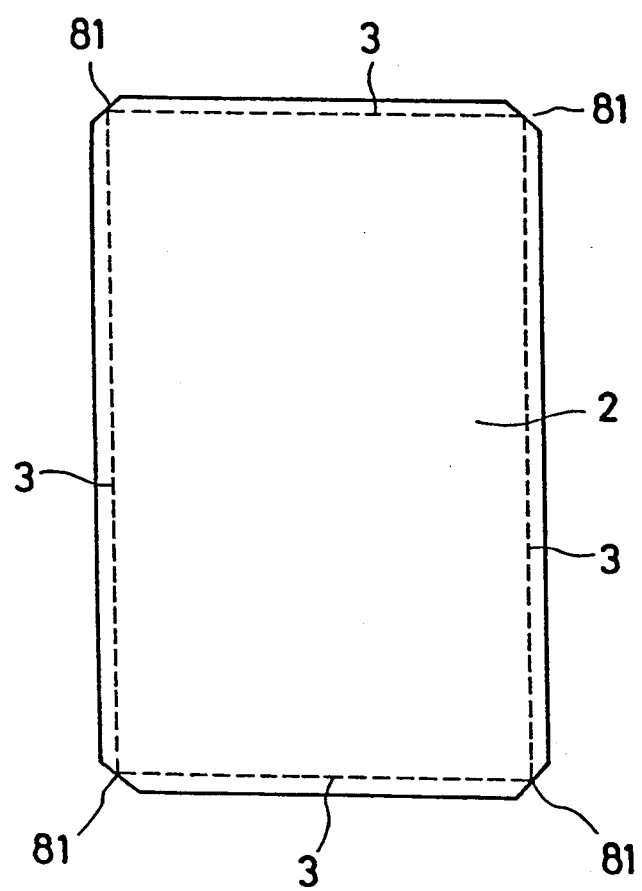
FIG. 15 is a front view of a sheet of another preferred embodiment of the present invention.
Figure 16:
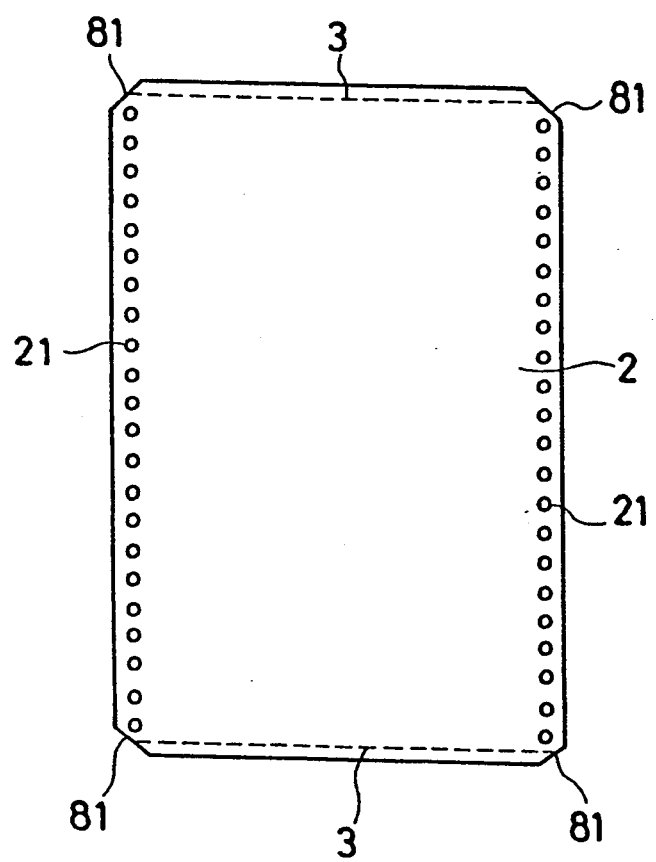
FIG. 16 is a front view of a sheet of another preferred embodiment of the present invention.

While the corners of the sheet 2 are cut out in the form of a square in the embodiment shown in FIG. 4 the corners 81 of the sheet 2 may be cut out in the form of a triangle only to the degree that the sheet stretcher 7 and the like can be attached to it to form the sheet 2, as shown in FIG. 15. By this construction, the members not covered with the sheet 2 are minimized in area. The sheet 2 may be the one in which many eyelets 21 are formed at equal intervals without expanded portions along the vertical sides thereof, as shown in FIG. 16.

When the sheet stretcher 7 with circular holes 126 as shown in FIG. 12 is used, the sheets 2 and the sheet stretcher 7 is preferably connected beforehand by inserting binding lashings such as wire or rope into the eyelets 21 in the sheet 2 and the hole 126 in order to prevent the occurrence of a situation where the sheets 2 would be flapped in wind while the sheet assembly is being assembled, and hence the expanded portion 5 would be removed from the sheet stretcher 7 and the sheet stretcher 7 would fall. As described above, the holes 126 are applicable for the temporary attachment of the sheets 2 to the sheet stretchers 7.

Figure 17:
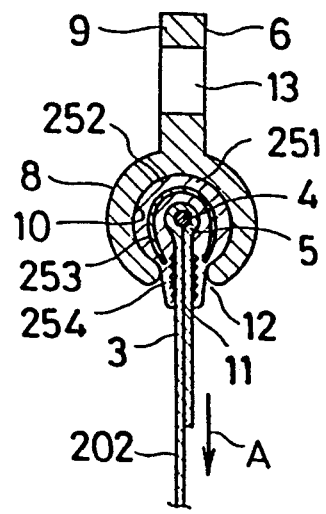
FIG. 17 is a sectional view of a sheet stretcher in which a sheet removal preventer is used.
Figure 18:
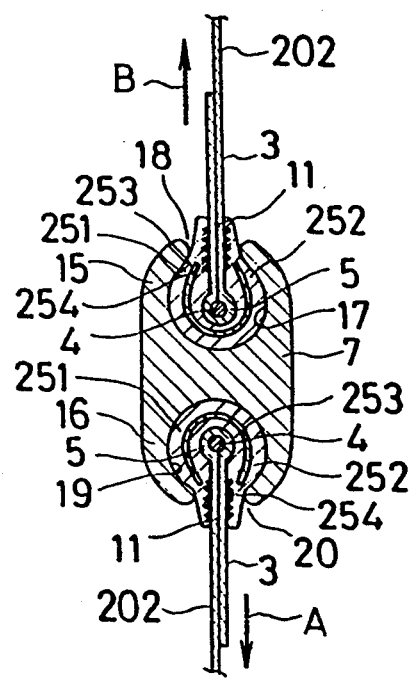
FIG. 18 is a sectional view of another sheet stretcher in which a sheet removal preventer is used.

When a sheet 202 is used whose thickness of the loop-like edge portion 5 is almost the same as the total thickness of the sheets overlapped at the position 3, as shown in FIGS. 17 and 18, a sheet removal preventer 251 is preferably disposed closely in each of the through holes 10, 17, and 19 in the sheet stretchers 6 and 7 around the edge 5 of the sheet 202. The sheet removal preventer 251 comprises a flexible body 252 made of hard or soft vinyl chloride and a bendable metal plate-like core 253 which is buried in the body 252. In the body 252, a plurality of protuberances of teeth 254 is formed at positions where the body 252 touches the surfaces of the sheet 202, especially at positions in the vicinity of the slits 12, 18 and 20 where it touches the sheet 202. The sheet removal preventer 251 prevents the edges 5 of the sheets 202 from being removed from the through holes 10, 17 and 19 through the slits 12, 18 and 20 due to tension exerted on the sheets 202 in the direction A or B.

Figure 19:
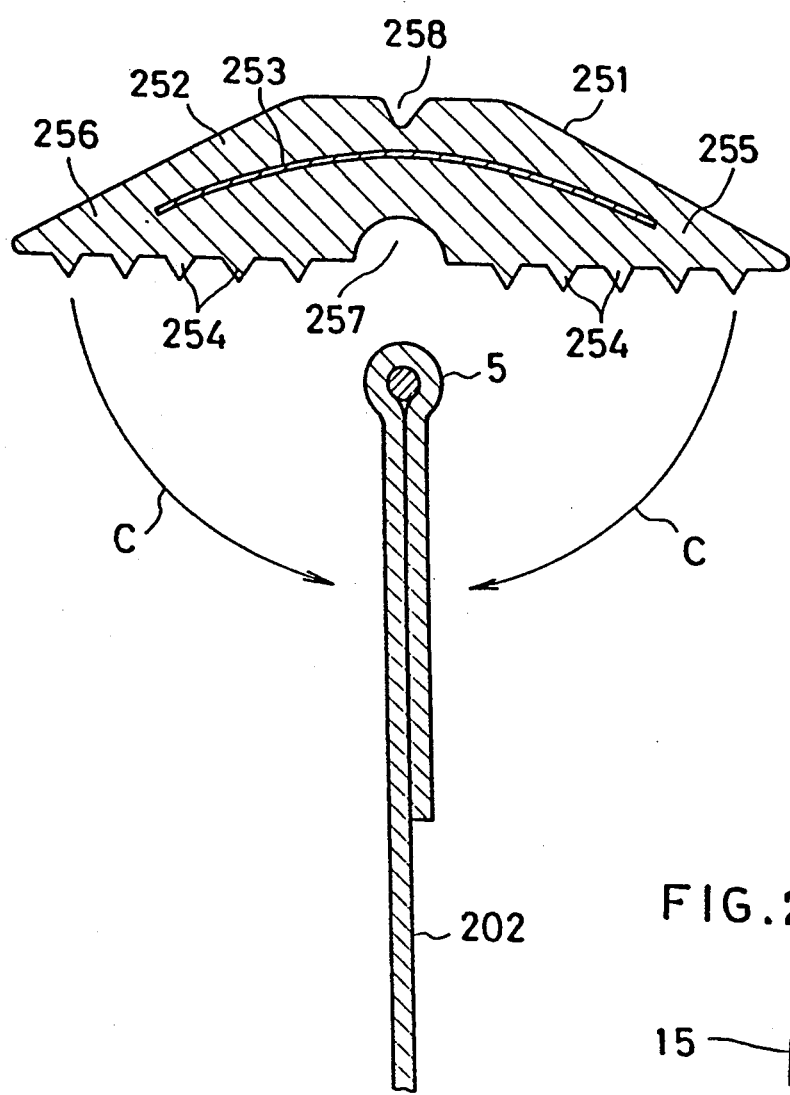
FIG. 19 is a detailed explanatory view of time sheet removal preventer shown in FIGS. 17 and 18.

The section of the sheet removal preventer 251 is almost trapezoidal, as shown in FIG. 19, before it is applied to the edge portion 5 of the sheet 202. Therefore, the shape of both sides 255 and 256 of the preventer placed at the position of each of the slits 12, 18 and 20 is wedge-like after it is attached to each of the through holes 10, 17 and 19 in the sheet stretchers 6 and 7. The sheet removal preventer 251 is bent in the opposite directions C to hold and wrap the edge 5 of the sheet 202, as shown in Fig. 19. It is attached to each of the through holes 10, 17 and 19 in the sheet stretchers 6 and 7 with its gripped state being maintained. A semicircular groove 257 as well as a V-like groove 258 may be formed on the body 252 in order to facilitate its bending in the direction C as well as the insertion of the preventer into the through holes 10, 17 and 19 by forming the shape of the preventer after bending so as to correspond to the shape of each of the through holes 10, 17 and 19 in the sheet stretchers 6 and 7. The core member 253 buried in the body 252 holds the shape of the bent preventer 251, so that the holding of the edge 5 of the sheet 202 by the preventer 251 is thereby maintained positively.

According to the sheet stretchers 6 and 7 applied to the present sheet assembly 1, only by inserting the sheet removal preventers 251 holding the edges 5 of the sheets 202 gradually into the through holes 10, 17 and 19 at one end to cause the edges 5 of the sheets 202 to be received in the thorough holes 10, 17 and 19 many sheets 202 are stretched very easily in a short time to assemble a sheet assembly. Even if tension is exerted on the sheet 202 in the directions A and B in this assembly, the undesirable removal of the edges 5 of the sheets 202 from the through holes 10, 17, and 19 through the slits 12, 18 and 20 is avoided and a result, the stretched state of the sheets 202 is maintained positively because the edges 5 of the sheets 202 are held firmly by the preventers 251 used in the respective sheet stretchers 6 and 7.

Especially, in the sheet removal preventer 251 having both wedge-like sides 255, 256 and teeth 254 of the present embodiment, even if the edges 5 of the sheets 202 are intended to move away from the through holes 10, 17 and 29 through the slits 12, 18 and 20 by the tension exerted on the sheet 202 in the directions A and B, they are pressed strongly by the sheet stretchers 6 and 7 so that both the wedge-like sides 255 and 256 may be closer to each other at the positions of the slits 12, 18 and 20 with the edges 11 of the sheets 202 being bitten firmly by the teeth 254. As a result, the edges 5 of the sheets 202 are surely prevented from being removed from the through holes 10, 17 and 19 through the slits 12, 18 and 20.

While in the above embodiment the edge 5 of the sheet 202 is prevented from being removed from the though hole 10 and so on only by the sheet removal preventer 251. In addition, a staple extending through both the sides 255, 256 and the edge portion 11 of the sheet 202 is applicable. Such use of the staple serves to securely prevent the sheet from removal.

While the rope 14 is inserted into the holes 13 and 42 to attach the sheet to the scaffolding in the above embodiments, instead of this, hooks or the like provided on a belt with a buckle may be hooked in the hole 13 and 42 to attach the sheet to the scaffolding. Alternatively, a given tension may be added to the sheet 2 so that the sheet 2 may be put up in a tense state by using a belt with a buckle 24 as shown in FIG. 7.

Figure 20:
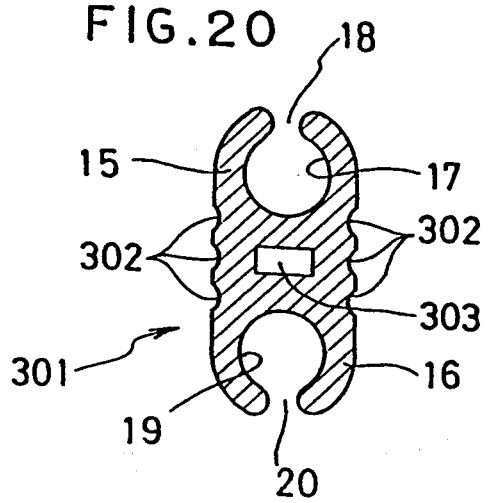
FIG. 20 is a sectional view of a sheet stretcher of another preferred embodiment of the present invention.

A sheet stretcher 301 having semicircular grooves 302 on each side of the central portion thereof as well as a rectangular cavity 303 at the center thereof through the overall length thereof, as shown in FIG. 20, may be used to assemble the sheets. The sheet stretcher 301 in the present embodiment is lightened, excellent in appearance as well as easy to dealt with.

According to the present invention as described above, the sheet stretcher has a first hole which slidably receives a expanded portion formed in the edge of the sheet and a first slit communicating with the first hole and through which the edge portion of the sheet formed continuous to its expanded portion is insertable, so that the sheet assembly is obtained in a short time just by inserting the expanded portion of the sheet into the first hole.

Since each sheet stretcher is connected to a sheet stretching frame through the connecting means, the sheet assembly is held firmly to the frame. As a result, a possible swell in the center of the sheet assembly due to a wind and so on is prevented.

According to the sheet stretcher wherein a slot through which a string-like member which connects the sheet stretcher to the frame is insertable is disposed between the first and the second holes, and, for example, if the sheet assembly is heightened in correspondence to the increasing height of a high-rise building in the middle of construction by gradually stretching the sheets upwards in accordance with the progress of construction of the high-rise building, its temporary attachment is released and the uppermost sheet stretcher as it is can be used to thereby reduce the working time greatly.

In the sheet assembly including the sheet removal preventer disposed in the first hole so as to surround the edge of the sheet in order to prevent the edge of the sheet from being removed from the first hole through the first slit, and even if a sheet with no expanded portion at one end is used, the stretched state of the sheet is maintained securely, and the proper function of the sheet assembly is fulfilled securely without the appearance of the sheets being impaired.

I claim:

1. An attachment adjuster for attaching a sheet stretcher to a frame, the stretcher comprising a base and connecting means formed at the base to connect the base with a frame for stretching a sheet, the base including a first hole for slidably receiving an expanded portion formed at an edge of the sheet; a first slit communicating with the first hole and through which the edge of the sheet formed continuous to the expanded portion is insertable; a second hole for slidably receiving a further expanded portion formed at an edge of a further sheet; a second slit communicating with the second hole and through which the edge of the further sheet continuous to the further expanded portion is insertable; a third hole; and a third slit communicating with the third hole;

the attachment adjuster having an expanded portion to be slidably received in the third hole and a plate portion integral with the expanded portion so as to be extendible through the third slit.

2. A sheet stretcher comprising a base having at one end thereof a first hole for slidably receiving an expanded portion formed at an edge of a sheet, and a first slit in communication with the first hole and through which the edge of the sheet continuous to the expanded portion is insertable; and having at another end thereof a second hole for slidably receiving a further expanded portion formed at an edge of a further sheet, and a second slit in communication with the second hole and through which the edge of the further sheet continuous to the further expanded portion is insertable, the base having a substantial rectangular shape in cross-section thereof and having a slot into which a string-like member for connecting the sheet stretcher with a frame is insertable, the slot being disposed at a central portion of the base between the first and second holes, and passing through the base.

3. A sheet to be stretched by a sheet stretcher as claimed in claim 2, and comprising an expanded portion at each of at least the opposite edges.

4. A sheet stretcher comprising a base and connecting means formed at the base to connect the base with a frame for stretching a sheet, the base having a first hole for slidably receiving an expanded portion formed at the edge of the sheet; a first slit communicating with the first hole and through which the edge of the sheet formed continuous to the expanded portion is insertable; a second hole for slidably receiving a further expanded portion formed at an edge of a further sheet; and a second slit communicating with the second hole and through which the edge of the further sheet continuous to the further expanded portion is insertable, the connecting means having a third hole formed in the base; and a third slit formed in the base so as to communicate with the third hole and said stretcher further comprising an attachment adjuster having an expanded portion to be slidably received in the third hole; and a plate portion integral with the expanded portion and insertable through the third slit.

5. A sheet as claimed in claim 4, wherein the plate portion has a slit through which the string-like member is insertable.

6. A sheet stretcher as claimed in claim 4, wherein the plate portion comprises a gripper for gripping the frame releasably.

7. A sheet to be stretched by a sheet stretcher as claimed in claim 4, comprising an expanded portion at each of at least the opposite edges.

8. A sheet stretcher comprising a base having at one end thereof a first hole for slidably receiving an expanded portion formed at an edge of a sheet, and a first slit in communication with the first hole and through which the edge of the sheet continuous to the expanded portion is insertable; and having at another end thereof a second hole for slidably receiving a further expanded portion formed at an edge of a further sheet, and a second slit in communication with the second hole and through which the edge of the further sheet continuous to the further expanded portion is insertable, the base having a slot into which a string-like member for connecting the sheet stretcher with a frame is insertable, the slot being disposed between the first and second holes, and passing through the base.

* * * * *